Jan. 6, 1925.
P. O. HELLER
GAUGE FOR CORN PLANTERS
Filed May 4, 1923
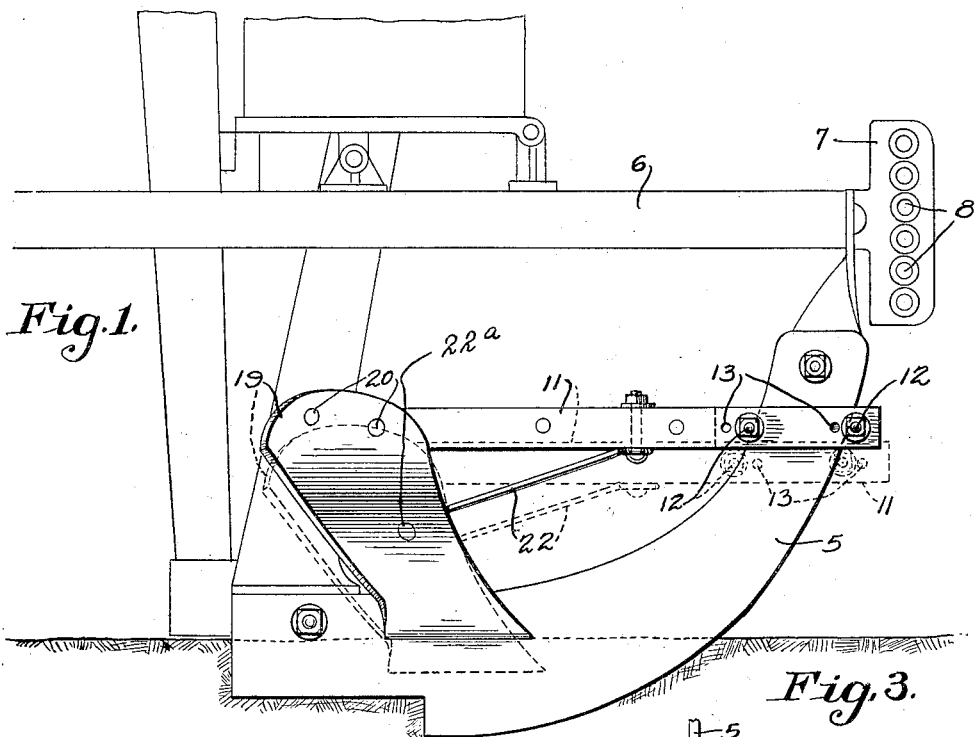
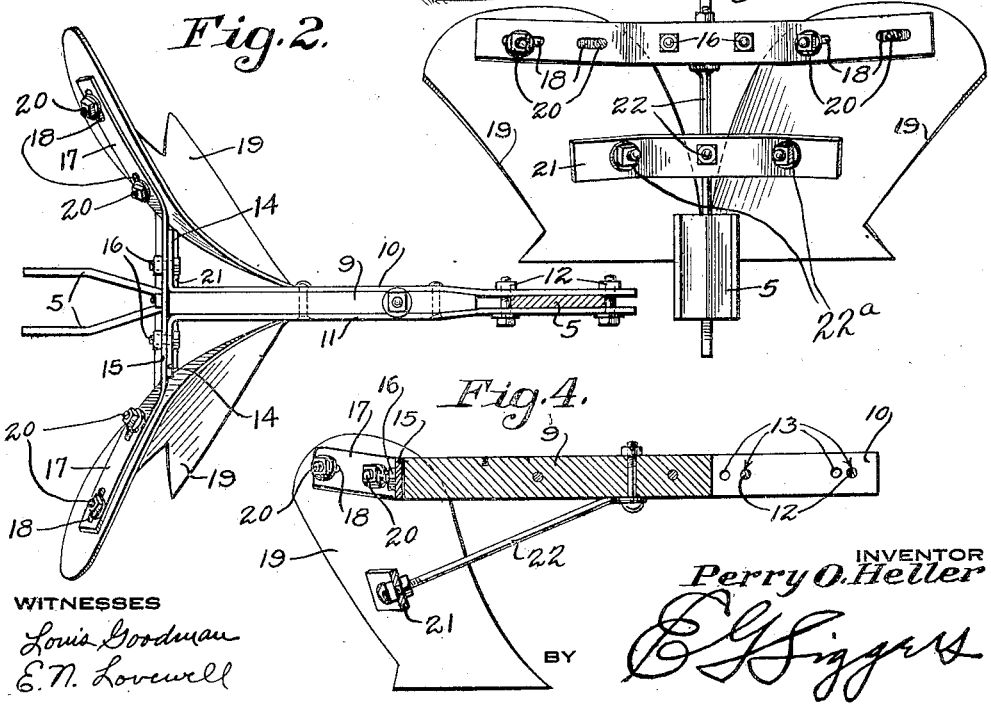
INVENTOR
Perry O. Heller
WITNESSES Patented Jan. 6, 1925.

1,522,365

UNITED STATES PATENT OFFICE.

PERRY OSCAR HELLER, OF PROPHETSTOWN, ILLINOIS.

GAUGE FOR CORN PLANTERS.

Application filed May 4, 1923. Serial No. 636,585.

*To all whom it may concern:*

Be it known that I, PERRY O. HELLER, a citizen of the United States, residing at Prophetstown, in the county of Whiteside and State of Illinois, have invented new and useful Improvements in Gauges for Corn Planters, of which the following is a specification.

This invention relates to a gauge for corn planters and the like, by means of which the depth to which seed is covered may be regulated.

In gauges heretofore used for this purpose, the object has been to limit the depth to which the furrow opener penetrates the ground, and after the seed has been deposited, the furrow is closed in the usual manner. In different localities, however, and in different seasons, the amount of moisture in the ground varies greatly and consequently it becomes necessary, in order to secure proper germination of the seed, to deposit it at different depths, while at the same time the depth at which it should be covered depends upon different conditions.

The object of the present invention is to provide an adjustable attachment to limit the depth to which the seed is covered, regardless of the depth to which the furrow is opened. For example, the furrow may be opened to a depth of four inches and the seed deposited at the bottom thereof, while the attachment which I have invented may be adjusted so as to remove a portion of the earth from the furrow and limit the depth to which the seed is planted to two inches or to any other depth which may be deemed most desirable for successful germination of the seed.

The nature of the invention and its details of construction will be better understood from the following description, taken in connection with the accompanying drawing which illustrates the preferred form of the invention.

In the drawing:—

Fig. 1 is a view in side elevation of the attachment applied to a corn planter of ordinary construction.

Fig. 2 is a plan view of the attachment.

Fig. 3 is a rear elevation of the same.

Fig. 4 is a vertical longitudinal section of the same.

The corn planter, as shown, is provided at its forward end with a runner or furrow opener 5, supported in the usual manner from a beam 6 having a clevis 7 at its forward end with a plurality of openings 8, by means of which a suitable draft device may be adjustably connected so that the furrow opener 5 will open the furrow to any desired depth.

The attachment which constitutes my invention includes a comparatively small beam 9 having steel side plates 10 and 11 riveted to the sides thereof and extending forwardly and adapted to embrace the upper end of the furrow opener 5 and to be clamped thereto by means of bolts 12. A plurality of holes 13 are drilled through the plates 10 and 11, and certain of these holes are spaced farther apart than others, whereby the bolts 12 may be set at different distances apart, thereby adapting the beam to rest at different points along the shank of the furrow opener 5 which tapers upwardly. One position of the attachment is shown in full lines in Fig. 1, while another position is shown in dotted lines.

The side plates 10 and 11, at their rear ends, are turned laterally as shown at 14, and have a cross bar 15 secured thereto by means of bolts 16 or the like. The outer ends of the cross bar 15 are bent rearwardly as shown at 17, and are provided with a plurality of slots 18 to which oppositely-disposed plow shares 19 may be adjustably secured by means of bolts 20. The lower parts of the plow shares are held in suitably spaced relation by a bracket 21 which may be connected with the beam by a suitable brace 22 and with the plow shares 19 by bolts 22$^a$.

The beam 9 and the plow shares carried thereby may be adjusted bodily on the shank of the furrow opener 5, while the inclination of the plow shares may be adjusted by means of the bolts 20 connected with the slots 18. It will be observed that this construction permits an outward and inward movement of the tops of the plow shares 19 which, since this movement is about bolts 22$^a$ as a pivot, causes an opposite movement of the points of the shares to adjust them to fit planter runners of different thickness. The thickness of planter runners varies widely, and it is essential that the points of the shares fit tightly against the sides of the runner to prevent dirt or trash passing therebetween. When the corn or other seed is planted during a dry period, it is desirable to plant the seed at a greater depth than usual in order that sufficient moisture may be obtained for proper germination. It is not, however, desirable to have the seed covered to so great a depth, since when covered too deeply, it will not come up evenly and in some cases will not come up at all. Moreover, it is always desirable to have the seed planted at a considerable depth below the normal surface of the ground so that the roots will not be injured by cultivating and so that the roots will also be strong enough to sustain the stalks against strong winds. The advantages of my invention, in permitting this deep planting while at the same time removing a portion of the earth completely from the furrow so that the seed will not be covered too deeply, will be obvious from the foregoing description.

It will be noted that the attachment herein described is simple in its construction, inexpensive to manufacture, and is adapted to be readily applied to any of the usual types of corn planters. While I have shown and described the detailed construction of one form in which the principles of my invention may be embodied, this is merely illustrative, and it is obvious that various modifications may be made therein as long as such modifications mark no material departure from the salient features of the invention as expressed in the claims.

What is claimed is:

1. A gauge for planters, including a beam, vertically adjustable means for securing the front end of the beam to the shank of a furrow opener, and a pair of oppositely disposed plow shares adjustably secured at their upper ends to the rear end of the beam to permit the points of said shares to engage the sides of furrow openers of varying thickness.

2. A gauge for planters, including a beam, means for adjustably securing the front end of the beam to the shank of the furrow opener, a pair of oppositely disposed plow shares secured to the rear end of the beam, and means for adjusting the inclination of said plow shares with respect to the beam.

3. An attachment for the furrow opener of a planter, comprising a plow having a beam, forwardly projecting side plates secured to the beam, means for clamping the side plates to the shank of the furrow opener, said plow including oppositely disposed shares adapted to receive the rear portion of the opener between them, and means for adjusting the inclination of the shares with respect to the beam.

4. In a planter, the combination with a furrow opener, of a plow including a beam with oppositely disposed plow shares secured thereto, side plates secured to the beam and projecting forwardly on opposite sides of the shank of the furrow opener and secured thereto in such a relation that the plow is supported above the lower edge of the opener in position to remove a portion of the earth from the furrow, and to leave it at one side of the furrow.

5. In a planter, the combination with a furrow opener, of a plow including a beam with oppositely disposed plow shares secured thereto, side plates secured to the beam and projecting forwardly on opposite sides of the shank of the furrow opener, bolts for securing the side plates to the shank in various positions of vertical adjustment, said plates having series of holes for receiving the bolts, so that the latter may engage the edges of the furrow opener in any of the adjusted positions.

6. A gauge for planters, including a beam, means for securing the front end of the beam to the shank of the furrow opener, a pair of oppositely disposed plow shares at the rear end of the beam, a transverse bracket member connecting intermediate points of the plow shares, a downwardly inclined brace extending from an intermediate point of the beam to said bracket member, and a cross bar secured transversely to the rear end of the beam and adjustably connected to the upper ends of the plow shares for adjusting the inclination of the latter with respect to the beam.

In testimony that I claim the foregoing as my own, I have hereto affixed my signature.

PERRY OSCAR HELLER.